United States Patent
Jin et al.

(10) Patent No.: US 9,934,052 B1
(45) Date of Patent: Apr. 3, 2018

(54) LARGE SCALE VIRTUAL APPLICATION DEPLOYMENT USING SYSTEM PROVISIONING TOOLS

(71) Applicant: VCE Company, LLC, Richardson, TX (US)

(72) Inventors: Zunhe Jin, Sunnyvale, CA (US); Michael Tan, Palo Alto, CA (US); Sayajirao Patil, San Jose, CA (US); Boyu Wang, Santa Clara, CA (US); Akshaya Mahapatra, San Jose, CA (US)

(73) Assignee: VCE IP Holding Company LLC, Richardson, TX (US)

( * ) Notice: Subject to any disclaimer, the term of this patent is extended or adjusted under 35 U.S.C. 154(b) by 1004 days.

(21) Appl. No.: 14/134,403

(22) Filed: Dec. 19, 2013

(51) Int. Cl.
  *G06F 9/455* (2018.01)
(52) U.S. Cl.
  CPC .................. *G06F 9/45533* (2013.01)
(58) Field of Classification Search
  CPC ............. G06F 11/0712; G06F 11/1484; G06F 2009/45562; G06F 2009/45575; G06F 2212/152; G06F 8/63
  See application file for complete search history.

(56) References Cited

U.S. PATENT DOCUMENTS

| | | | | |
|---|---|---|---|---|
| 8,464,250 | B1* | 6/2013 | Ansel | G06F 9/45504 709/220 |
| 2013/0297964 | A1* | 11/2013 | Hegdal | G06F 11/0712 714/2 |
| 2015/0058837 | A1* | 2/2015 | Govindankutty | G06F 9/45533 718/1 |

OTHER PUBLICATIONS

Silva et al. ("CloudBench experiment automation for cloud environments", IEEE, Mar. 2013, pp. 302-311).*

* cited by examiner

*Primary Examiner* — Bing Zhao
(74) *Attorney, Agent, or Firm* — Polsinelli PC

(57) ABSTRACT

Aspects of the present disclosure involve systems and methods for the automatic packaging and deployment of virtual machines in a virtual environment. More particularly, the disclosure involves a system that automatically packages two virtual machines, a console virtual machine and a template virtual machine, in a virtual application. The template virtual machine initiates communication with the console virtual machine to generate multiple virtual machine instances.

15 Claims, 4 Drawing Sheets

LARGE SCALE VIRTUAL APPLICATION DEPLOYMENT USING SYSTEM PROVISIONING TOOLS

TECHNICAL FIELD

Aspects of the present disclosure relate to virtual environments and virtual machines, and in particular, to the automatic deployment of multiple virtual machines instances in a virtual environment.

BACKGROUND

In a virtual environment, multiple and related virtual machines are often packaged or pooled together into a single entity or object. Pooling the virtual machines into a single object allows the virtual machines to be deployed into an active environment efficiently and at one time, once all of the virtual machines have been provisioned. In the context of a distributed computing system, such as multi-tiered web applications, deploying all of the required virtual machines at once is more efficient and manageable.

However, when the scope of a distributed computing system is large, the size of the pool of virtual machines grows proportionally, even though most of the virtual machine instances included within the pool may be of the same type. To account for such size issues, conventional methods simply increase the size of the virtual machine pool, resulting in wasted storage, memory, etc. Moreover, in cases where each virtual machine instance is slightly different, conventional methods cannot engage in cloning; rather, conventional methods require the generation of a single virtual machine for each distinct virtual machine type, again, resulting in wasted storage and memory.

SUMMARY

Aspects of the present disclosure involve systems and methods for the automatic packaging and deployment of virtual machines in a virtual environment. More particularly, the disclosure involves a system that automatically packages two virtual machines, a console virtual machine and a template virtual machine, in a virtual application. The template virtual machine initiates communication with the console virtual machine to generate multiple virtual machine instances.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. It should be noted that the drawings are not necessarily to scale; however, the emphasis instead is being placed on illustrating the principles of the inventive concepts. Also, in the drawings the like reference characters refer to the same parts throughout the different views. The drawings depict only typical embodiments of the present disclosure and, therefore, are not to be considered limiting in scope.

DETAILED DESCRIPTION

Aspects of the present disclosure include systems and/or methods for the automatic packaging and deployment of virtual machines in a virtual environment using automatic provisioning mechanisms. More specifically, the disclosure involves a system that automatically configures virtual machine instances of a virtual machine according to a virtual machine template. Generally speaking, a virtual machine is a software component that emulates the specifications of a physical computing architecture. Emulating the physical machine enables the virtual machine to execute software programs in the exact manner that the physical machine would execute the software. Accordingly, a virtual machine instance represents a specific realization of a given virtual machine.

The disclosed system may arrange multiple virtual machine instances into a virtual application entity referred to as a "vApp". Thus, a vApp represents a logical entity, composed of one or more virtual machines, which can be managed as a single unit or object. Stated differently, the vApp encapsulates or otherwise packages components of a software application, such as a multi-tiered application (e.g. a three tiered web application), and the various operational systems (e.g. an operating system) and policies, network configurations, etc., associated with the application and its required application components. VApps enable the virtual machines they include to work together, for example in a stack as an application, and support distributed computing architectures, such as a cloud computing architecture. Typically, vApps are portable, enabling everything contained within a vApp to be transferred to another infrastructure, and further, enabling a vApp to be cloned.

The vApps generated by the system may be imported within a virtual environment. Generally speaking, a virtual environment represents a mechanism for delivering computing resources that have been decoupled from physical machinery. For example, a virtual environment can enable the running of virtual desktops, servers, or other types of virtual computing components. The virtual environment is used to deliver the virtual machines and associated software to external devices, such as a client device. In one particular embodiment, the system may deploy a single vApp into a virtual environment, where the vApp only includes two virtual machines: a console virtual machine and a template virtual machine. Subsequently, instances of the template virtual machine may be generated and configured according to the console virtual machine, as needed, resulting in more efficient creation and management of virtual machines instances.

Figure 1:
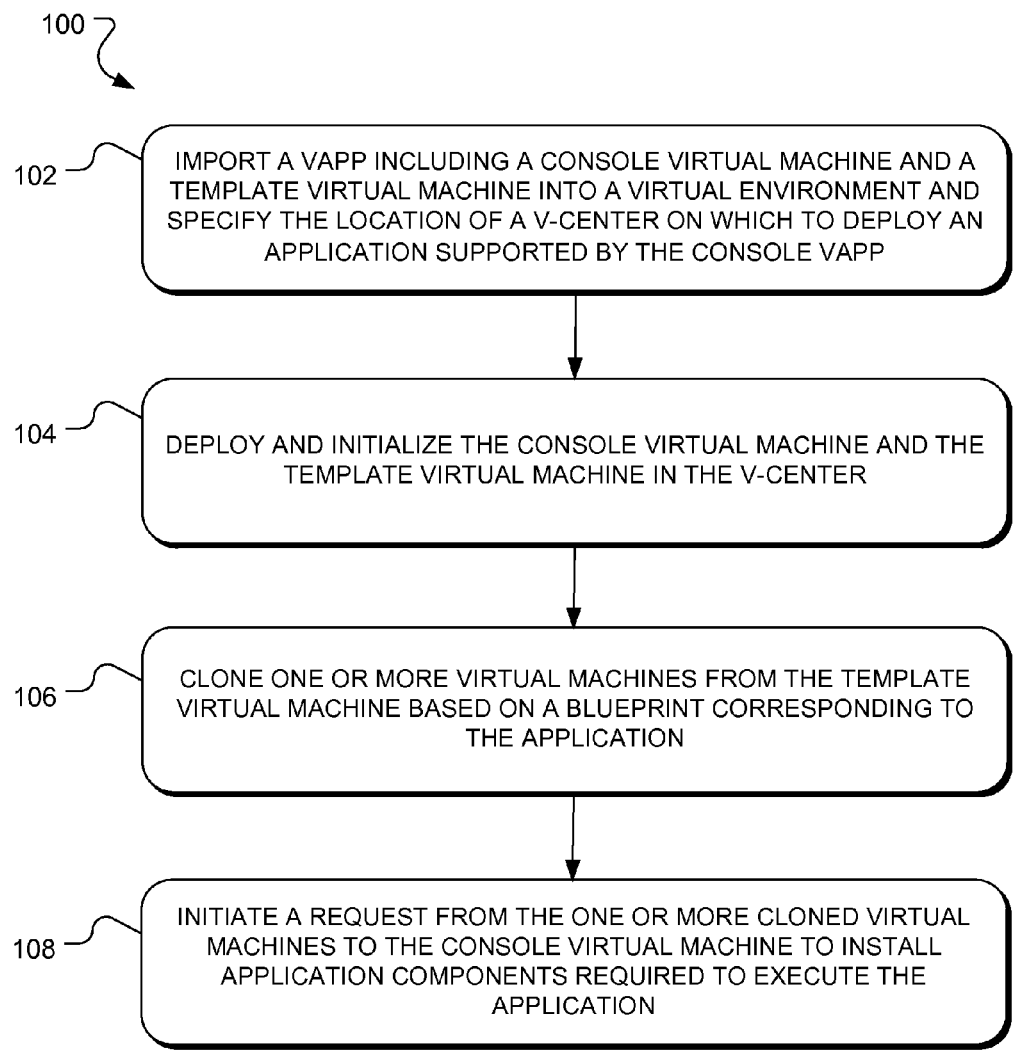
FIG. 1 is a flowchart illustrating an example process for automatically deploying virtual applications, according to aspects of the present disclosure.
Figure 2A:
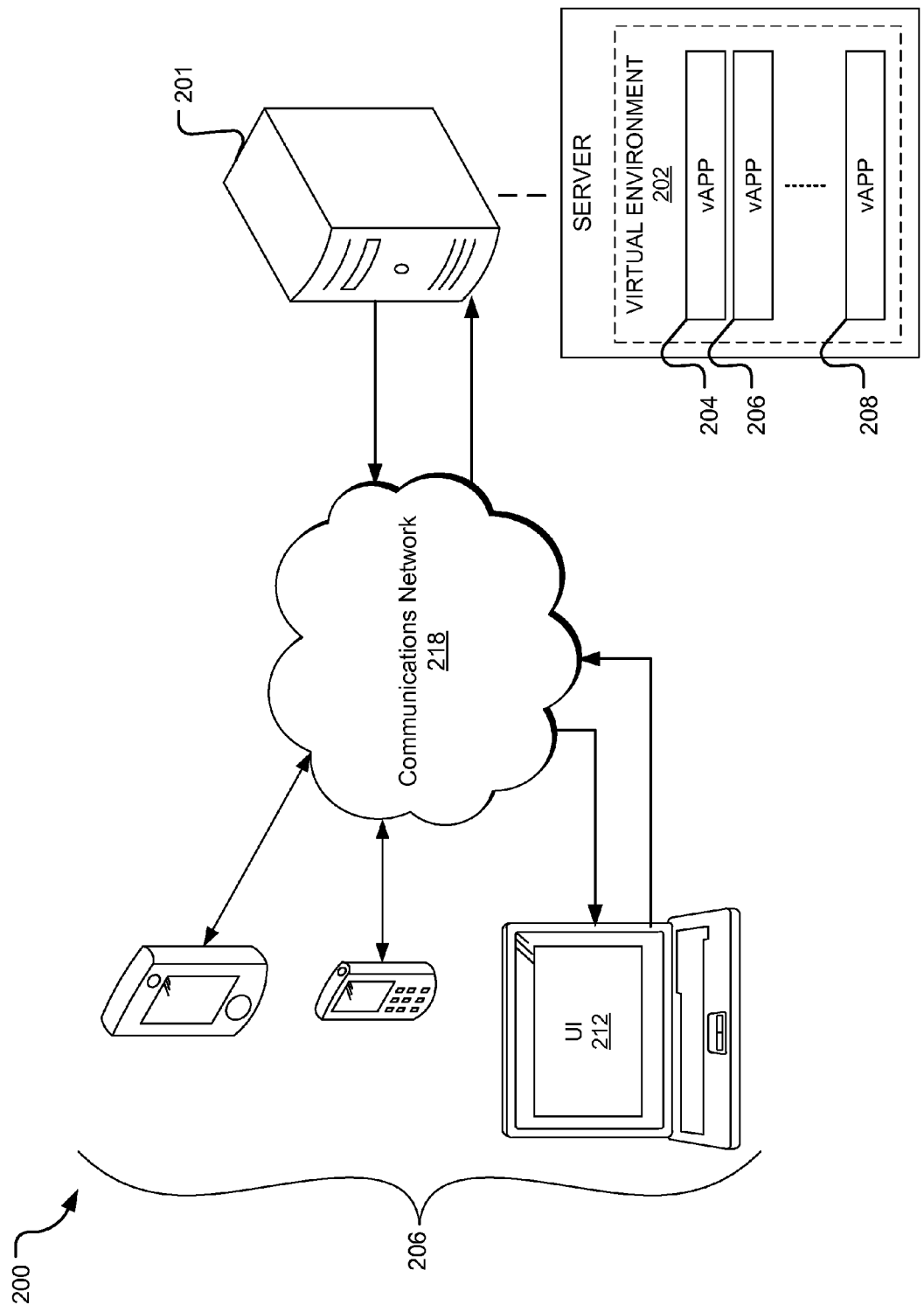
FIG. 2A-2B are block diagrams illustrating a computing architecture for automatically deploying virtual applications, according to aspects of the present disclosure.
Figure 2B:
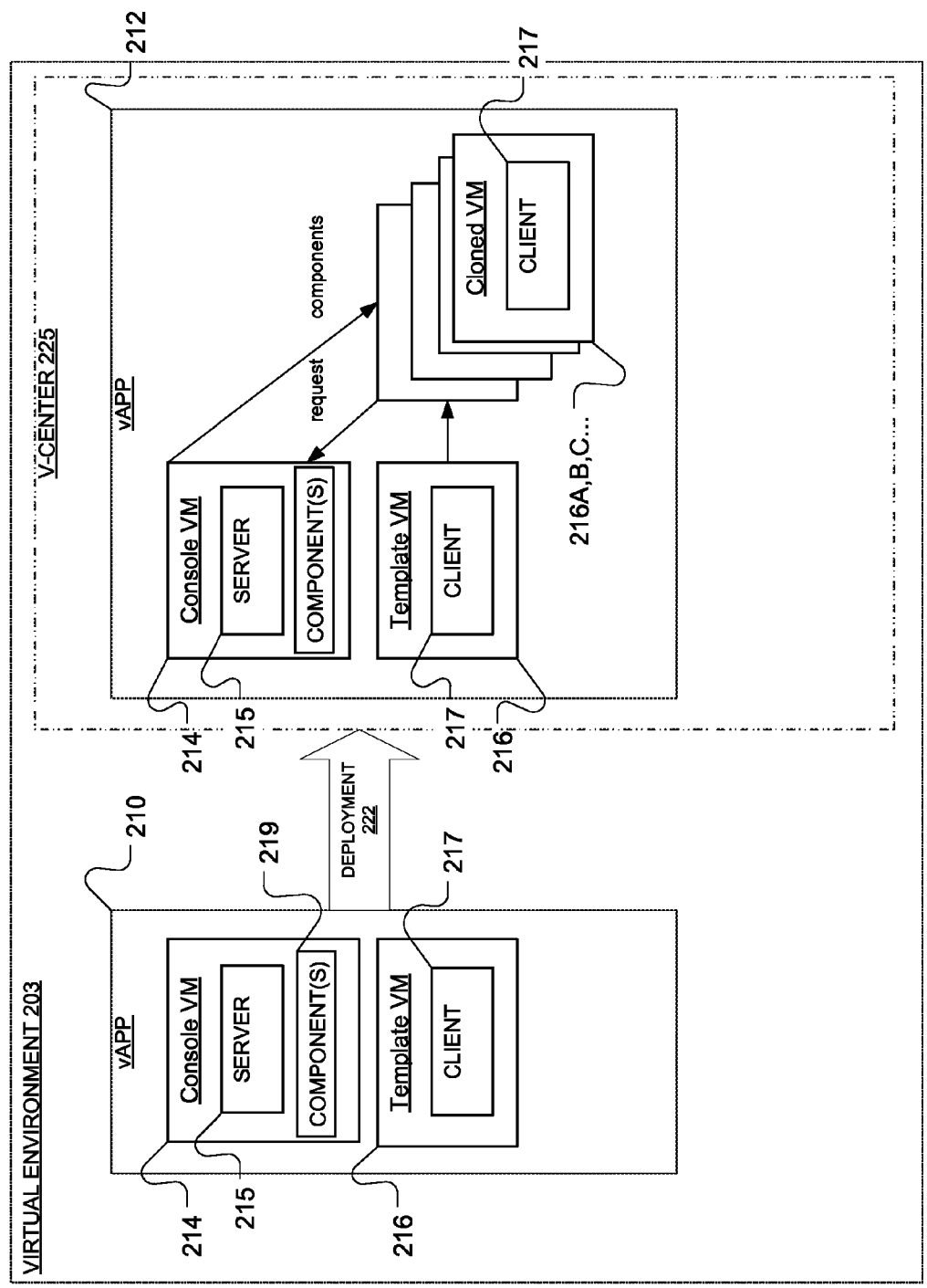

An illustrative process and system for automatically deploying virtual instances included in a vApp in a virtual environment using automatic provisioning mechanisms is depicted in FIG. 1 and FIGS. 2A-2B. In particular, FIG. 1 illustrates an example process 100 for automatically deploying virtual instances in a virtual environment. FIGS. 2A-2B illustrate a computing architecture 200 including hardware and/or software components and in particular a virtual environment 202 that may be used to perform or otherwise execute the process 100.

Referring now to FIGS. 2A-2B and initially to FIG. 2A, the computing architecture 200 includes a server 201 containing a virtual environment 202 that provides a set of routines, functions, and/or software that enables the provisioning and management of one or more vamp's 204-208. The vApps 204-208 may be provisioned, cloned, or otherwise managed at one or more client devices 206 over a communication network 218, which may be the Internet, an Intranet, an Ethernet network, a wireline network, a wireless network, and/or another communication network. More particularly, the one or more client devices 206 may include a user interface ("UI") application 212, such as a browser application, to generate a request for generating, cloning, and/or managing vApps. In response, the server system 201 may transmit instructions that may be processed and/or executed to generate, or otherwise display, one or more interfaces or input forms (e.g. a graphical user-interface), which may include interactive elements, such as buttons, forms, fields, selections, inputs, streams, etc., for enabling a user to provision, clone, and/or manage a vApp. In one particular embodiment, the UI application 212 may be the VMware® vCenter software configured to manage virtual environments, vApps and/or virtual machines. The client device(s) 206 may be a personal computer, work station, server, mobile device, mobile phone, tablet device, of any suitable type.

FIG. 2B is an example illustration of a virtual environment (e.g. virtual environment 202) included within the server 201 that contains one or more vApps. As illustrated, the virtual environment 203 includes two vApps: vApp 210 and vApp 212. The vApp 210 includes two virtual machines, a console virtual machine 214 and a template virtual machine 216. The console virtual machine 214 is a virtual machine configured to support a software application, such as a three-tiered web application. The console virtual machine 214 functions as a provisioning software configured to install application components 219 required by the application the console virtual machine supports. Stated differently, the console virtual machine 214 is, or otherwise includes, provisioning software that may be used to install and configure software components 219 to enable the execution of the software application it supports.

An illustrative example of a virtual machine and its corresponding software components will now be provided. Assume the provisioning software included within the console virtual machine 214 may be configured to support a three-tiered web application. Accordingly, the console virtual machine 214 includes the various software components, such as a web server, database, and an interface(s) required to execute the three-tiered web application. Additionally, the console virtual machine 214 includes provisioning software capable of installing such components. More specifically, the virtual machine containing the provisioning software (i.e. the console virtual machine) contains the binaries of the components that are to be installed on the generated virtual machine. For example, if a MySQL open source database management software needs to be installed on a generated virtual machine, then the provisioning software will push the "binaries of MySQL" to the generated virtual machine. In one embodiment, the provisioning software may include the binary itself, or alternatively, may include a link corresponding to the binary that identifies where it can download and push the binary to the generated virtual machine. The console virtual machine also contains instructions/scripts that will be pushed to the generated virtual machine and executed to complete the installation. For example, if the desired binary corresponded to a RedHat® package, instructions to install the RedHat® binary would be a "rpm command", which when executed, will install the software on generated virtual machine.

Referring back to FIG. 2B, the provisioning software included within the virtual machine 214 may include configuration definitions for different types of virtual machines capable of being provisioned. Configuration definitions include unique identifiers that identify the software components that would be installed on any generated virtual machines. The provisioning software translates or otherwise processes the unique identifier (e.g., a "name") to identify an actual component, pushes any binaries corresponding to the component to the generated virtual machine, and executes scripts to install the software. The configuration definitions may correspond to different types of virtual machines, such as a RedHat® virtual machine, CentOS® virtual machine, Windows® virtual Machine, Vmware® virtual machine and/or the like. In the illustrated embodiment of FIG. 2B, the provisioning software is depicted in conjunction with a server 215, which is configured to serve requests of clients interesting in creating, provisioning, and/or cloning virtual machine instances.

The virtual machine 216 included in the vApp 210 is a "template" virtual machine that provides a base operating system required to support and execute the application and various application components included within the console virtual machine 214. Additionally, the virtual machine 216 includes a client 217 that corresponds to the server 215 included within the console virtual machine 214. The client 217 communicates with the server 215 (e.g. the server 215 initiates a request) to create, clone, or otherwise access a virtual machine instance according to the various configuration definitions included within the console virtual machine 214.

Referring now to FIG. 1, process 100 begins with importing a vApp including a console virtual machine and a template virtual machine into a virtual environment (operation 102). Referring to FIG. 2B, the vApp 210, including the console virtual machine 214 and the template virtual machine 216, is imported into the virtual environment 203. According to one embodiment, during the import process, a virtual center 225 ("v-center") on which the application included within the vApp will be deployed may be identified. The v-center is a virtual environment management center that provides any required application programming interfaces required to clone virtual machines.

Additionally, during the import process, the location of an application blueprint (a type of configuration definition) may be specified, which contains a reference to one or more of the application components 219 included within the console virtual machine 214 and further describes a mapping between the application components 219 and the template virtual machine 216. The mapping identifies which application components 219 the template virtual machine 216 needs to install and configure. In one embodiment, the application blueprint may be an extensible markup language ("XML") file that contains the components of the application and a mapping of the application components and the template virtual machines. The following is an example blueprint titled "Blueprint 1" containing the application components for a Red Hat Linux and its corresponding mapping to a Red Hat Linux template virtual machine:

Blueprint 1
<?xml version="1.0" encoding="UTF-8" standalone="yes" ?>
<ApplicationBlueprint xmlns="http://www.vce.com/devops/1">
<VirtualMachine>
<computerName>apache_server</computerName>
<templateName>rhel63</templateName>

```xml
<adminPassword>password</adminPassword>
<ipAddress>XXX.22.60.81</ipAddress>
<subnetMask>XXX.275.255.0</subnetMask>
<gateway>XXX.22.60.1</gateway>
<dnsServers>XXX.22.80.12</dnsServers>
<guestOs>rhel63</guestOs>
<applications>apacheOnRhel</applications>
</VirtualMachine>
<VirtualMachine>
<computerName>tomcat_server1</computerName>
<templateName>rhel63</template>
<adminPassword>password</adminPassword>
<ipAddress>XXX.24.60.84</ipAddress>
<subnetMask>XXX.255.255.0</subnetMask>
<gateway>XXX.21.60.1</gateway>
<dnsServers>XXX.22.60.12</dnsServers>
<guestOs>rhel63</guestOs>
<applications>tomcatOnRhel</applications>
</VirtualMachine>
<VirtualMachine>
<computerName>tomcat_server2</computerName>
<templateName>rhel63</template>
<adminPassword>password</adminPassword>
<ipAddress>XXX.12.60.83</ipAddress>
<subnetMask>XXX.255.255.0</subnetMask>
<gateway>XXX.22.60.1</gateway>
<dnsServers>XXX.22.67.12</dnsServers>
<guestOs>rhel63</guestOs>
<applications>tomcatOnRhel</applications>
</VirtualMachine>
<VirtualMachine>
<computerName>mysqlserver</computerName>
<templateName>rhel63</template>
<adminPassword>password</adminPassword>
<ipAddress>XXX.72.60.84</ipAddress>
<subnetMask>XXX.255.255.0</subnetMask>
<gateway>XXX.77.60.1</gateway>
<dnsServers>XXX.222.88.12</dnsServers>
<guestOs>rhel63</guestOs>
<applications>mysqlOnRhel</applications>
</VirtualMachine>
</ApplicationBlueprint>
```

As illustrated above, the blueprint identifies any components required by the RedHat® Linux application, and the specific template virtual machine that may be used to install the RedHat® Linux virtual machine.

Referring back to FIG. 1, once the vApp has been imported into the virtual environment, the console virtual machine containing provisioning software for creating and/or cloning instances of virtual machines is initialized (operation 104). As illustrated in FIG. 2B, initializing the console virtual machine 212 starts the deployment process 222, which deploys the console virtual machine 214 and the template virtual machine 216 at the identified v-center 225.

Next, one or more virtual machine instances are cloned from the template virtual machine included within the vApp (operation 106). The number of virtual machine instances cloned is based on the blueprint included or otherwise identified when the vApp was originally imported. Referring to the example above, four (4) virtual machines may be cloned or otherwise generated. Notably, as illustrated in FIG. 2B, the vApp 203 only includes two virtual machines, the console virtual machine 212 and the template virtual machine 216, from which many more (in this case 4) virtual machine instances may be generated. The vApp 203 does not include a virtual machine for each virtual machine instance generated from the template virtual machine 216, resulting in more efficient use of memory and storage.

Once cloned, the virtual machines are deployed, initialized and configured (operation 108). More particularly, as illustrated in FIG. 2B, the cloned virtual machines 216 A, B, and C are assigned an internet protocol address, a host name, etc. Subsequently, the client 217 included within the virtual machines 216 A, B, and C initiate a request to the console virtual machine 214 to download and install the desired application components 219. After the application components have been installed within the cloned virtual machines 216 A, B, and C the application is ready to be executed. Referring to the three-tiered web application example above, all of the required components—the web server, database, and interfaces—required to execute the three-tiered web application are installed within the cloned template virtual machine, thereby enabling use of the three-tiered web application.

Figure 3:
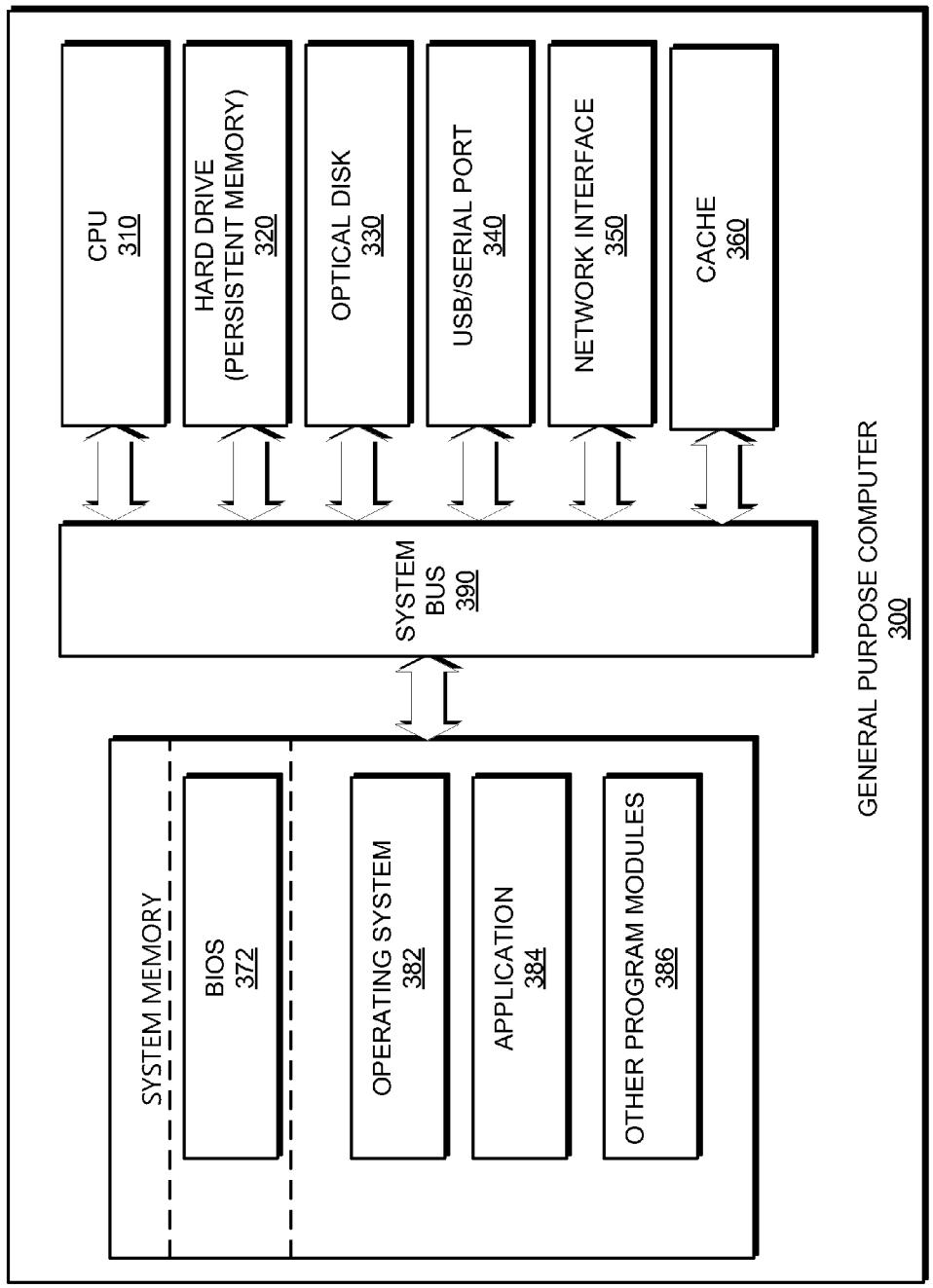
FIG. 3 is illustrates an example computing device, according to aspects of the present disclosure.

FIG. 3 illustrates an example general purpose computer 300 that may be useful in implementing the described systems (e.g. the server 201). The example hardware and operating environment of FIG. 3 for implementing the described technology includes a computing device, such as general purpose computing device in the form of a personal computer, server, or other type of computing device. In the implementation of FIG. 3, for example, the general purpose computer 300 includes a processor 310, a cache 360, a system memory 320 and a system bus 390 that operatively couples various system components including the cache 360 and the system memory 320 to the processor 310. There may be only one or there may be more than one processor 310, such that the processor of the general purpose computer 300 comprises a single central processing unit (CPU), or a plurality of processing units, commonly referred to as a parallel processing environment. The general purpose computer 300 may be a conventional computer, a distributed computer, or any other type of computer; the disclosure included herein is not so limited.

The system bus 390 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) and random access memory (RAM). A basic input/output system (BIOS), containing the basic routines that help to transfer information between elements within the general purpose computer 300 such as during start-up may be stored in ROM. The general purpose computer 300 further includes a hard disk drive 320 for reading from and writing to a persistent memory such as a hard disk, not shown and an optical disk drive 330 for reading from or writing to a removable optical disk such as a CD ROM, DVD, or other optical medium.

The hard disk drive 320 and optical disk drive 330 are connected to the system bus 390. The drives and their associated computer-readable medium provide nonvolatile storage of computer-readable instructions, data structures, program engines and other data for the general purpose computer 300. It should be appreciated by those skilled in the art that any type of computer-readable medium which can store data that is accessible by a computer, such as magnetic cassettes, flash memory cards, digital video disks, random access memories (RAMs), read only memories (ROMs), and the like, may be used in the example operating environment.

A number of program engines may be stored on the hard disk, optical disk, or elsewhere, including an operating system 382, an application 384, and one or more other application programs 386. A user may enter commands and information into the general purpose computer 300 through input devices such as a keyboard and pointing device connected to the USB or Serial Port 340. These and other input devices are often connected to the processor 310 through the USB or serial port interface 340 that is coupled to the system bus 390, but may be connected by other interfaces, such as a parallel port. A monitor or other type of display device may also be connected to the system bus 390 via an interface (not shown). In addition to the monitor, computers typically include other peripheral output devices (not shown), such as speakers and printers.

The embodiments of the present disclosure described herein are implemented as logical steps in one or more computer systems. The logical operations of the present disclosure are implemented (1) as a sequence of processor-implemented steps executing in one or more computer systems and (2) as interconnected machine or circuit engines within one or more computer systems. The implementation is a matter of choice, dependent on the performance requirements of the computer system implementing aspects of the present disclosure.

Accordingly, the logical operations making up the embodiments of the disclosure described herein are referred to variously as operations, steps, objects, or engines. Furthermore, it should be understood that logical operations may be performed in any order, unless explicitly claimed otherwise or a specific order is inherently necessitated by the claim language.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed is:

1. A system for deploying a virtual application, the system comprising:
   a computing device comprising:
      a memory including a virtual application comprising:
         a console virtual machine including all provisioning software, data, and configurations for installing a plurality of application components utilized in execution of an application; and
         a template virtual machine in operable communication with the console virtual machine, the template virtual machine comprising an operating system to execute the application; and
      at least one processor to:
         clone the template virtual machine to generate a virtual machine instance;
         initiate a request from the virtual machine instance to the console virtual machine to access the plurality of application components so that a corresponding application component of the plurality of application components can be installed in the virtual machine instance, the corresponding application component specified for the virtual machine instance; and
         install, by the console virtual machine using the provisioning software, data, and configurations of the console virtual machine, the corresponding application component to the virtual machine instance of the template virtual machine.

2. The system of claim 1, wherein the application is a three-tiered web application and wherein the plurality of application components includes a server, a database, and an interface.

3. The system of claim 1, further comprising:
   importing the virtual application into a virtual environment; and
   identifying a location of a v-center to deploy the application.

4. The system of claim 1, further comprising:
   identifying a blueprint describing a number of virtual machine instances for cloning; and
   wherein the template virtual machine is cloned the number of times described in the identified blueprint to generate a plurality of virtual machine instances.

5. The system of claim 1, further comprising:
   identifying a blueprint defining a mapping between the plurality of application components and the virtual machine instance of the template virtual machine; and
   wherein the application component installed at the virtual machine instance is specified in the mapping.

6. A method for deploying a virtual application, the method comprising:
   cloning, by at least one processor a template virtual machine to generate a virtual machine instance, the template virtual machine comprising an operating system for executing an application;
   initiating, by the at least one processor, a request from the virtual machine instance of the template virtual machine to a console virtual machine comprising provisioning software, data, and configurations for installing a plurality of application components utilized in execution of the application, the request for installing a corresponding application component of the plurality of application components to the virtual machine instance of the template virtual machine, the corresponding application component specified for the virtual machine instance;
   installing, by the at least one processor and the console virtual machine using the provisioning software, data, and configurations of the console virtual machine, the corresponding application component to the virtual machine instance of the template virtual machine; and
   wherein the template virtual machine and the console virtual machine are included in the virtual application.

7. The method of claim 6, wherein the application is a three-tiered web application and wherein the plurality of application components includes a server, a database, and an interface.

8. The method of claim 6, further comprising:
   importing the virtual application into a virtual environment; and
   identifying a location of a v-center to deploy the application.

9. The method of claim 6, further comprising:
   identifying a blueprint describing a number of virtual machine instances for cloning; and wherein the template virtual machine is cloned the number of times described in the identified blueprint to generate a plurality of virtual instances.

10. The method of claim 6, further comprising:

identifying a blueprint defining a mapping between the plurality of application components and the virtual machine instance of the template virtual machine; and wherein the application component installed at the virtual machine instance is specified in the mapping.

11. A non-transitory computer readable medium encoded with instructions for deploying a virtual application, the instructions executable by a processor and comprising:

cloning a template virtual machine to generate a virtual machine instance, the template virtual machine comprising an operating system to execute an application;

initiating a request from the virtual machine instance of the template virtual machine to a console virtual machine comprising provisioning software, data, and configurations for installing a plurality of application components utilized in execution of the application, the request for installing a corresponding application component of the plurality of application components to the virtual machine instance, the corresponding application component specified for the virtual machine instance;

installing, by the console virtual machine using the provisioning software, data, and configurations of the console virtual machine, the corresponding application component to virtual machine instance of the template virtual machine; and wherein the template virtual machine and the console virtual machine are included in the virtual application.

12. The non-transitory computer readable medium of claim 11, wherein the application is a three-tiered web application and wherein the plurality of application components includes a server, a database, and an interface.

13. The non-transitory computer readable medium of claim 11, further comprising:

importing the virtual application into a virtual environment; and identifying a location of a v-center to deploy the application.

14. The method of claim 11, further comprising:

identifying a blueprint describing a number of virtual machine instances for cloning; and wherein the template virtual machine is cloned the number of times described in the identified blueprint to generate plurality of virtual instances.

15. The non-transitory computer readable medium of claim 11, further comprising:

identifying a blueprint defining a mapping between the plurality of application components and the virtual machine instance of the template virtual machine; and wherein the application component installed at the virtual machine instance is specified in the mapping.

* * * * *